(12) United States Patent
Chan

(10) Patent No.: US 11,211,873 B2
(45) Date of Patent: Dec. 28, 2021

(54) POWER CONVERSION DEVICE

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 354 days.

(21) Appl. No.: 16/537,613

(22) Filed: Aug. 11, 2019

(65) Prior Publication Data

US 2020/0251997 A1   Aug. 6, 2020

(30) Foreign Application Priority Data

Jan. 31, 2019   (TW) .................................. 108103814

(51) Int. Cl.
*H02M 3/335*   (2006.01)
*H02M 1/34*   (2007.01)

(52) U.S. Cl.
CPC ......... *H02M 3/33576* (2013.01); *H02M 1/34* (2013.01); *H02M 3/33523* (2013.01)

(58) Field of Classification Search
CPC .............. H02M 3/33576; H02M 1/34; H02M 3/33523; H02M 1/342; H02M 3/33507; H02M 1/344; H02M 1/346; H02M 1/348; Y02B 70/10
USPC .......................................... 363/21.12–21.18
See application file for complete search history.

(56) References Cited

U.S. PATENT DOCUMENTS

| | | | | |
|---|---|---|---|---|
| 8,711,588 B1* | 4/2014 | Jeong | ................... | H02M 1/4258 363/65 |
| 9,077,246 B2* | 7/2015 | Jeong | ..................... | H02M 3/285 |
| 10,177,669 B1* | 1/2019 | Chiu | ..................... | H02M 3/285 |
| 10,587,199 B1* | 3/2020 | Chan | .................. | H02M 3/33507 |
| 10,749,444 B1* | 8/2020 | Chan | ................... | H02M 7/2176 |
| 2013/0343098 A1 | 12/2013 | Kern et al. | | |
| 2015/0103654 A1* | 4/2015 | Lee | ........................ | H04W 48/20 370/230 |
| 2015/0162845 A1* | 6/2015 | Lee | .................... | H02M 3/33569 363/17 |

FOREIGN PATENT DOCUMENTS

| | | |
|---|---|---|
| CN | 104201890 | 12/2014 |
| CN | 104779807 | 7/2015 |

(Continued)

OTHER PUBLICATIONS

Received STIC search report from EIC 2800 searcher John Digeronimo dated Jan. 17, 2020. (Year: 2020).*

*Primary Examiner* — Shawki S Ismail
*Assistant Examiner* — Htet Z Kyaw
(74) *Attorney, Agent, or Firm* — JCIPRNET

(57) ABSTRACT

A power conversion device is provided. The power conversion device includes a main transformer circuit, a power switch, an auxiliary transformer, a resonant circuit, and a switch circuit. When the power switch is turned on, the switch circuit is enabled according to energy stored in an output capacitor of the main transformer circuit, so that energy associated with a secondary side of a main transformer is coupled to the resonant circuit via the auxiliary transformer so the resonant circuit obtains coupling energy. When the power switch is turned off, the resonant circuit and a parasitic capacitor of the power switch form a resonant tank coupled to a grounding terminal of a power supply side based on the coupling energy.

10 Claims, 4 Drawing Sheets

(56) References Cited

FOREIGN PATENT DOCUMENTS

| | | |
|---|---|---|
| CN | 106550512 | 3/2017 |
| CN | 106685246 | 5/2017 |
| TW | I596880 | 8/2017 |
| TW | I626821 | 6/2018 |

* cited by examiner

POWER CONVERSION DEVICE

CROSS-REFERENCE TO RELATED APPLICATION

This application claims the priority benefit of Taiwan application serial no. 108103814, filed on Jan. 31, 2019. The entirety of the above-mentioned patent application is hereby incorporated by reference herein and made a part of this specification.

BACKGROUND

Technical Field

The invention relates to a power conversion device. More particularly, the invention relates to a power conversion device capable of preventing a voltage spike from being generated on a power switch.

Description of Related Art

In a general voltage conversion circuit, such as a flyback voltage conversion circuit, hard switching is performed most of the time to switch the power switch. In this way, the voltage spike of the high-frequency ring is generated on the power switch owing to inductance of the transformer inside the voltage conversion circuit. The voltage spike may cause the power switch to be damaged more easily. Further, when the voltage spike occurs, the power switch may be penetrated through by the high voltage of the voltage spike. A power switch featuring greater resistance to high voltages is thus required to be selected. In addition, the high-frequency ring may cause circuit noise, electromagnetic interference (EMI), and other problems, and faulty operations may even occur in the voltage conversion circuit or the peripheral circuit.

In order to solve the foregoing problems, a snubber circuit, such as a resistor-capacitor snubber circuit (RC snubber) formed by the resistor and capacitor or a resistor-capacitor-diode snubber circuit (RCD snubber) formed by the resistor, capacitor, and diode, is added on the switch or the transformer most of the time, or the active clamping manner may even by adopted to suppress the voltage spike. Nevertheless, the voltage conversion efficiency may be lowered or difficulty of circuit design may be increased when the foregoing methods are adopted.

SUMMARY

The invention provides a power conversion device capable of preventing a voltage spike of a high-frequency ring from being generated on a power switch.

A power conversion device in an embodiment of the invention includes a main transformer circuit, a power switch, an auxiliary transformer, a resonant circuit, and a switch circuit. The main transformer circuit includes a main transformer, a main leakage inductor coupled between a first side of the main transformer circuit and a power supply side, an output capacitor coupled to a secondary side of the main transformer circuit, and an output diode. An anode of the output diode is coupled to the secondary side of the main transformer circuit, and a cathode of the output diode is coupled to the output capacitor. The power switch is coupled between the first side of the main transformer circuit and a grounding terminal of the power supply side. The power switch is configured to be turned on or turned off through receiving a switch signal. A secondary side of the auxiliary transformer is coupled to the secondary side of the main transformer circuit. The resonant circuit is coupled to the power switch and a first side of the auxiliary transformer. The switch circuit is coupled to the secondary side of the main transformer circuit. When the power switch is turned on, the output diode is turned off, and the switch circuit is enabled according to energy stored in the output capacitor, so that energy associated with a voltage difference at a secondary side of the main transformer is coupled to the resonant circuit via the auxiliary transformer and that the resonant circuit obtains coupling energy, When the power switch is turned off, the resonant circuit and a parasitic capacitor between a first terminal of the power switch and a second terminal of the power switch form a resonant tank coupled to the grounding terminal of the power supply side according to the coupling energy.

To sum up, in the power conversion device of the invention, the switch circuit is enabled according to the energy stored in the output capacitor of the main transformer circuit when the power switch is turned on, so that the energy of the voltage difference associated between the anode and the cathode of the output diode is coupled to the resonant circuit via the auxiliary transformer, and that the resonant circuit obtains the coupling energy. When the power switch is turned off, the resonant circuit and the parasitic capacitor of the power switch form the resonant tank coupled to the grounding terminal of power supply side according to the coupling energy. In this way, in the power conversion device, the energy of the parasitic capacitor is conducted to the grounding terminal of the power supply side via the resonant tank, so that the voltage spike of the high-frequency ring is prevented from being generated on the power switch.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
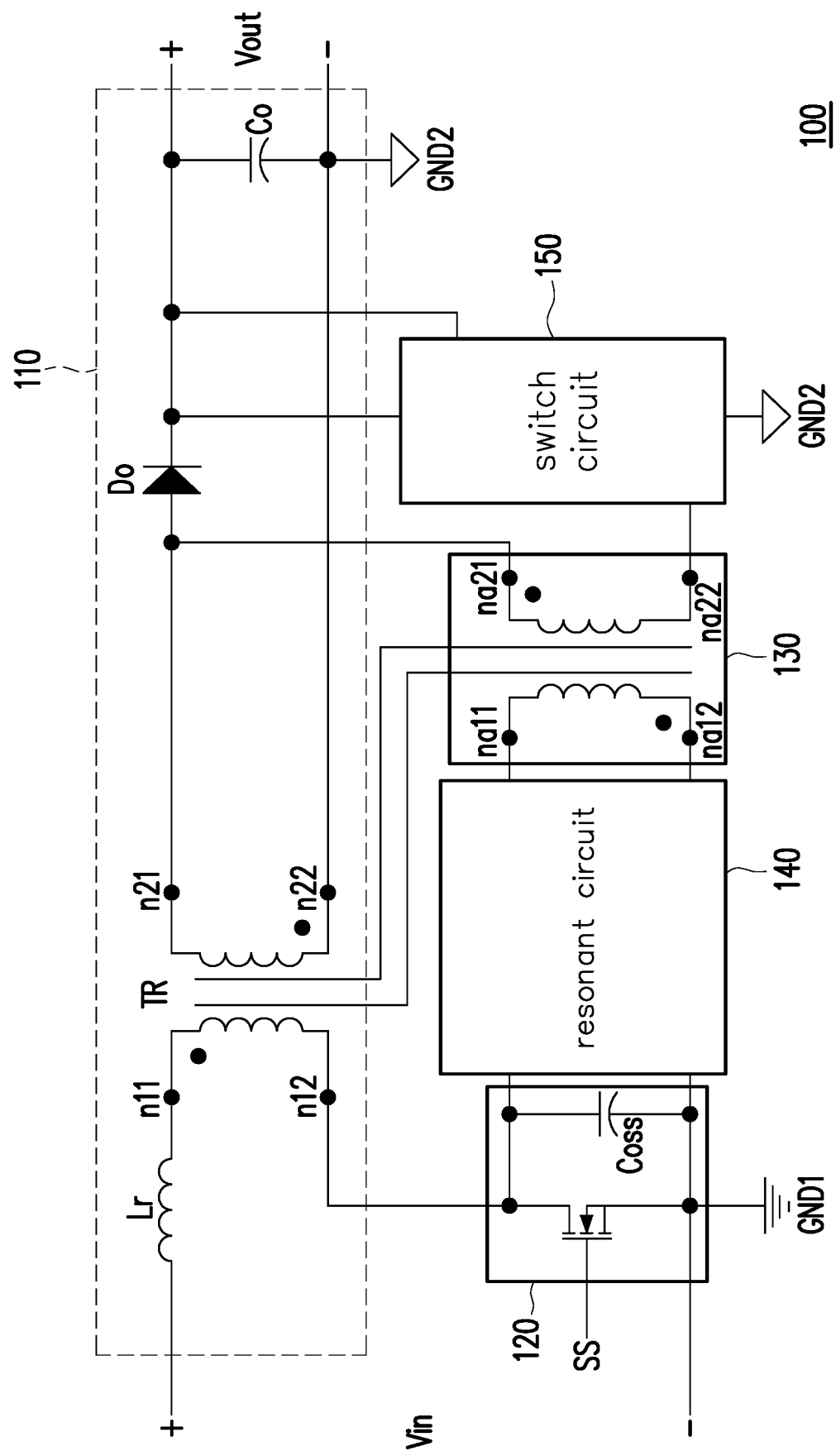
FIG. 1 is a schematic diagram illustrating a power conversion device according to an embodiment of the invention.

With reference to FIG. 1, FIG. 1 is a schematic diagram illustrating a power conversion device according to a first embodiment of the invention. In this embodiment, a power conversion device 100 of the invention includes a main transformer circuit 110, a power switch 120, an auxiliary transformer 130, a resonant circuit 140, and a switch circuit 150. The main transformer circuit 110 includes a main transformer TR, a main leakage inductor Lr coupled between a first side of the main transformer TR and a power supply side Vin, an output capacitor Co coupled to a secondary side of the main transformer TR, and an output diode Do. The power conversion device 100 is adapted to an adapter. An anode of the output diode Do is coupled to the secondary side of the main transformer TR, and a cathode of the output diode Do is coupled to the output capacitor Co. Specifically, the first side of the main transformer TR includes nodes n11 and n12 of the main transformer TR. The second side of the main transformer TR includes nodes n21 and n22 of the main transformer TR. The main leakage inductor Lr is coupled between the power supply side Vin and the node n11 of the main transformer TR. The anode of the output diode Do is coupled to the node n21 of the main transformer TR. A cathode of the output diode Do is coupled to a first terminal of the output capacitor Co. A second terminal of the output capacitor Co is coupled to a grounding terminal GND2 of an output side Vout.

The power switch 120 is coupled between the first side of the main transformer TR and a grounding terminal GND1 of the power supply side Vin. That is, a first terminal of the power switch 120 is coupled to the node n12 of the main transformer TR. A second terminal of the power switch 120 is coupled to the grounding terminal GND1 of the power supply side Vin. The power switch 120 is configured to be turned on or turned off through receiving a switch signal SS. For instance, the power switch 120 may be an N type metal-oxide-semiconductor field-effect transistor (MOSFET). The first terminal of the power switch 120 is a drain. The second terminal of the power switch 120 is a source. A control terminal of the power switch 120 is a gate. When the control terminal of the power switch 120 receives the switch signal SS with a high voltage level, the power switch 120 is turned on. In contrast, when the control terminal of the power switch 120 receives the switch signal SS of a low voltage level, the power switch 120 is turned off. The power switch of the invention may be implemented through a transistor switch of any form and is not limited by this embodiment in this regard.

In this embodiment, a secondary side of the auxiliary transformer 130 is coupled to the secondary side of the main transformer TR. The resonant circuit 140 is coupled between the power switch 120 and a first side of the auxiliary transformer 130. The switch circuit 150 is coupled to the secondary side of the main transformer TR. Specifically, the first side of the auxiliary transformer 130 includes nodes na11 and na12. The second side of the auxiliary transformer 130 includes nodes na21 and n22. The node na21 of the auxiliary transformer 130 is coupled to the node n21 of the main transformer TR. The node na22 of the auxiliary transformer 130 is coupled to the switch circuit 150. The nodes na11 and na12 of the auxiliary transformer 130 are coupled to the resonant circuit 140.

In this embodiment, when the power switch 120 is turned on, the output diode Do is turned off. At this time, the switch circuit 150 is enabled according to energy stored in the output capacitor Co. That is, the switch circuit 150 is enabled according to a high level voltage stored in the output capacitor Co in a previous state (i.e., a state in which the power switch 120 is turned off). When the switch circuit 150 is enabled, the secondary side of the auxiliary transformer 130 receives energy associated with the secondary side of the main transformer TR and couples the energy to the resonant circuit 140, so that the resonant circuit 140 obtains coupling energy. Specifically, the secondary side of the auxiliary transformer 130 is further coupled between the anode of the output diode Do and the switch circuit 150. When the power switch 120 is turned on, a voltage difference between a voltage stored in the output capacitor Co and a voltage at the anode of the output diode Do is coupled to the first side of the auxiliary transformer 130 by the auxiliary transformer 130 from the secondary side of the auxiliary transformer 130 itself, so that the resonant circuit 140 obtains the coupling energy. Next, when the power switch 120 is turned off, the resonant circuit 140 and a parasitic capacitor Coss between a first terminal and a second terminal of the power switch 120 form a resonant tank coupled to the grounding terminal GND1 of the power supply side Vin according to the coupling energy.

Note that in the power conversion device 100, the switch circuit 150 is enabled according to the energy stored in the output capacitor Co when the power switch 120 is turned on, so that energy of the voltage difference associated between the anode and the cathode of the output diode Do is coupled to the resonant circuit 140 via the auxiliary transformer 130, and that the resonant circuit 140 obtains the coupling energy. When the power switch 120 is turned off, the resonant circuit 140 and the parasitic capacitor Coss form the resonant tank coupled to the grounding terminal GND1 of power supply side Vin according to the coupling energy. In this way, in the power conversion device 100, energy of the parasitic capacitor Coss is conducted to the grounding terminal GND1 of the power supply side Vin via the resonant tank, so that a voltage spike of a high-frequency ring is prevented from being generated on the power switch 120, and thereby, circuit noise and electromagnetic interference are less likely to occur, and the power switch 120 may be less susceptible to damage caused by the voltage spike.

Figure 2:
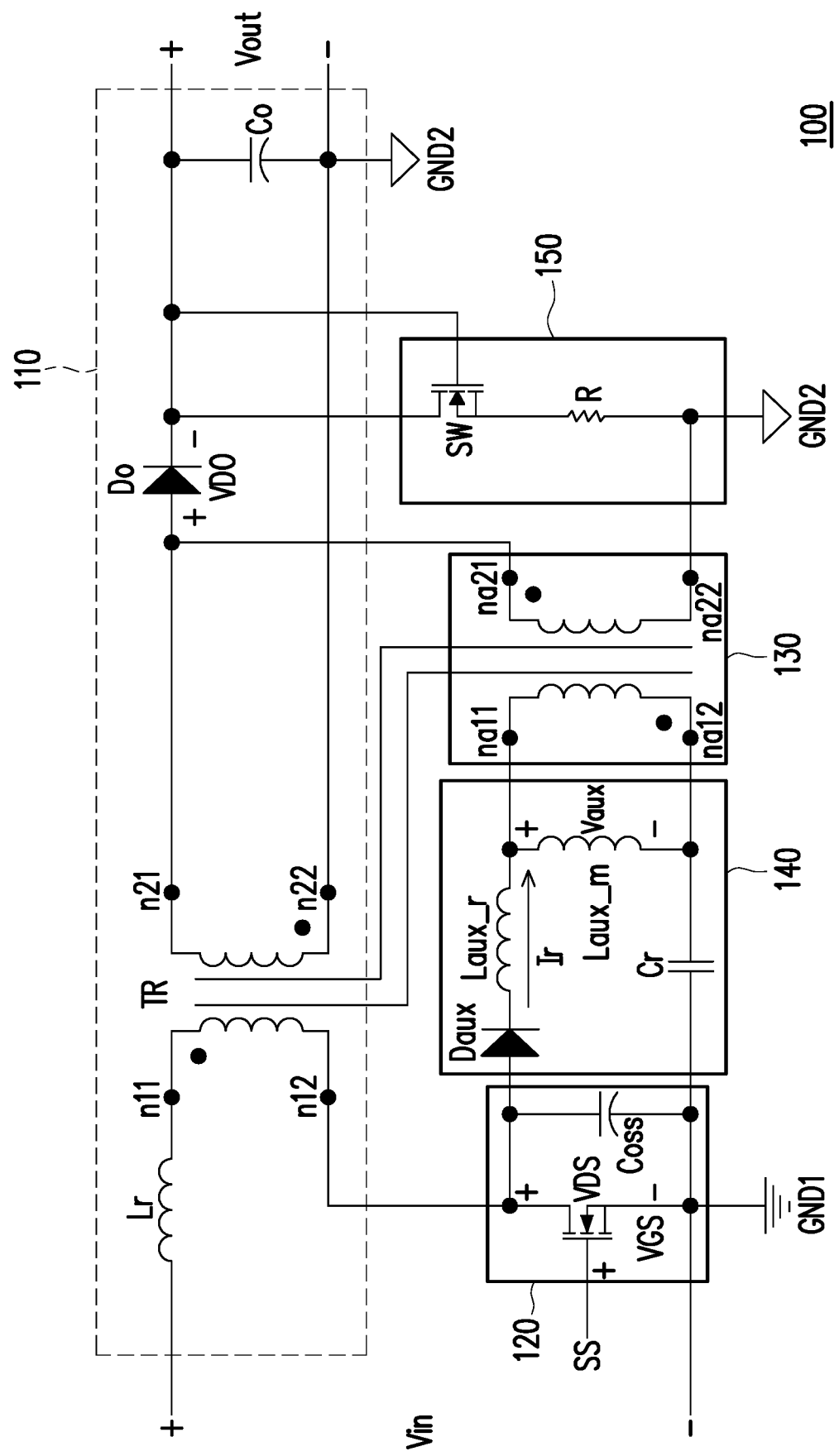
FIG. 2 is a schematic diagram illustrating the power conversion device according to the embodiment of FIG. 1.
Figure 3:
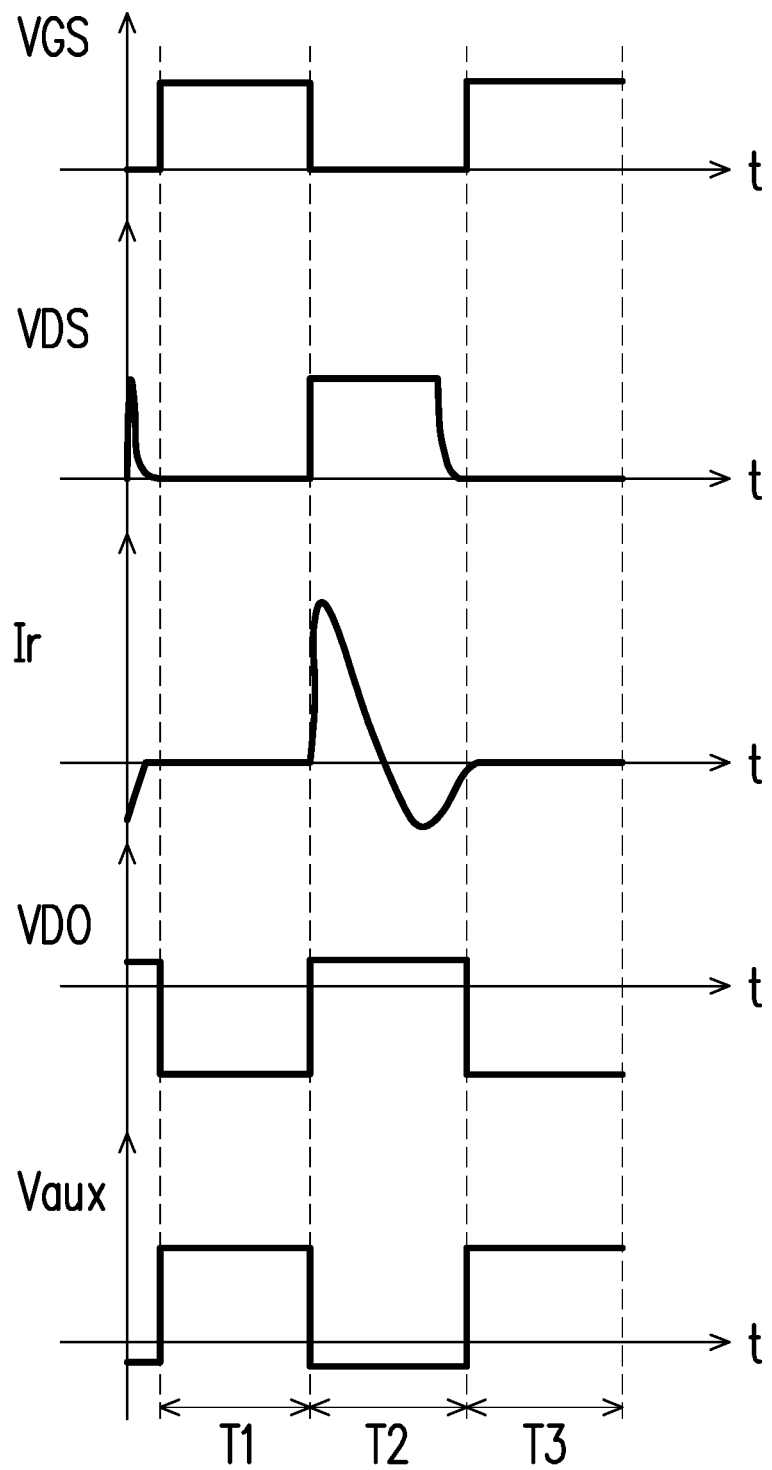
FIG. 3 is a timing diagram illustrating the power conversion device according to an embodiment of the invention.

Further, with reference to FIG. 2 and FIG. 3 together, FIG. 2 is a schematic diagram illustrating the power conversion device according to the embodiment of FIG. 1. FIG. 3 is a timing diagram illustrating the power conversion device according to an embodiment of the invention. In this embodiment, the switch circuit 150 includes a transistor switch SW. A first terminal of the transistor switch SW is coupled to the cathode of the output diode Do, a second terminal of the transistor switch SW is coupled to the secondary side of the auxiliary transformer 130, and a control terminal of the transistor switch SW is configured to receive the energy stored in the output capacitor Co. For instance, the transistor switch SW may be an N type metal-oxide-semiconductor field-effect transistor. The first terminal of the transistor switch SW is a drain. The second terminal of the transistor switch SW is a source. The control terminal of the transistor switch SW is a gate. The transistor switch SW may be turned on according to a high voltage level stored in the output capacitor Co. From another perspective, the transistor switch SW may be turned off according to a low voltage level stored in the output capacitor Co. The transistor switch of the invention may be implemented through a transistor switch of any form and is not limited by this embodiment in this regard.

In this embodiment, the resonant circuit 140 includes an auxiliary diode Daux, an auxiliary leakage inductor Laux_r, an auxiliary excitation magnetic inductor Laux_m, and a resonant capacitor Cr. An anode of the auxiliary diode Daux is coupled to the first terminal of the power switch 120. A first terminal of the auxiliary leakage inductor Laux_r is coupled to a cathode of the auxiliary diode Daux. A first terminal of the auxiliary excitation magnetic inductor Laux_m is coupled to the first terminal of the auxiliary leakage inductor Laux_r, and the auxiliary excitation magnetic inductor Laux_m is connected to the first side of the auxiliary transformer 130 in parallel. That is, the first terminal of the auxiliary excitation magnetic inductor Laux_m is also coupled to the node na11 of the auxiliary transformer 130, and the second terminal of the auxiliary excitation magnetic inductor Laux_m is also coupled to the node na12 of the auxiliary transformer 130. A first terminal of the resonant capacitor Cr is coupled to a second terminal of the auxiliary excitation magnetic inductor Laux_m, and a second terminal of the resonant capacitor Cr is coupled to the second terminal of the power switch 120 and the grounding terminal GND1 of the power supply side Vin. That is, the auxiliary diode Daux, the auxiliary leakage inductor Laux_r, the auxiliary excitation magnetic inductor Laux_m, and the resonant capacitor Cr are coupled to one another in series.

In this embodiment, at a time interval T1, the power switch 120 receives the switch signal SS of the high voltage level, and a voltage value of a voltage VGS between the gate and the source of the power switch 120 is in a high level state, so the power switch 120 is turned on. A voltage value of a voltage VDS between the drain and the source of the power switch 120 is in a low level state. At the same time, the anode of the output diode Do is in the low level state. Since the output capacitor Co stores energy received prior to a time interval T1, the cathode of the output diode Do features a higher voltage level, so that voltage values of voltages VDO located at two terminals of the output diode Do are less than 0 and the output diode Do is cut off. At this time, the switch circuit 150 is enabled according to the energy stored in the output capacitor Co prior to the time interval T1. The secondary side of the auxiliary transformer 130 receives the energy associated with the secondary side of the main transformer TR, so that the resonant circuit 140 obtains the coupling energy corresponding to the energy of the secondary side of the main transformer TR. Hence, the auxiliary excitation magnetic inductor Laux_m obtains the coupling energy and generates an inductor voltage Vaux between the first terminal and the second terminal of the auxiliary excitation magnetic inductor Laux_m. The auxiliary diode Daux is cut off according to the coupling energy received by the auxiliary excitation magnetic inductor Laux_m, so that a resonant current Ir is not generated. That is, the auxiliary diode Daux is cut off since the coupling energy received by the auxiliary excitation magnetic inductor Laux_m is greater than the energy stored in the parasitic capacitor Coss, so that the resonant current Ir is not generated.

At a time interval T2, the power switch 120 receives the switch signal SS of the low voltage level, and the voltage value of the voltage VGS between the gate and the source of the power switch 120 is in the low level state, so that the power switch 120 is turned off. The voltage value of the voltage VDS between the drain and the source of the power switch 120 is in the high level state. The output diode Do is turned on so that the voltage values of the voltages VDO at the two terminals of the output diode Do are equal to a threshold voltage of the output diode Do itself. Since the threshold voltage of the output diode Do is relatively less, when the time interval T2 begins, the auxiliary transformer 130 does not work. As regards the energy (i.e., the inductor voltage Vaux) between the first terminal and the second terminal of the auxiliary excitation magnetic inductor Laux_m, the auxiliary diode Daux is turned on owing to generation of the induction current, so as to form the resonant tank coupled to the grounding terminal GND1 of the power supply side Vin. In addition, the resonant current Ir is also generated.

Besides, the switch circuit 150 may further include a bypass resistor R according to visual design needs. In this embodiment, the auxiliary transformer 130 is further ensured to work at the time interval T1 and not to work at the time interval T2 via the bypass resistor R.

Figure 4:
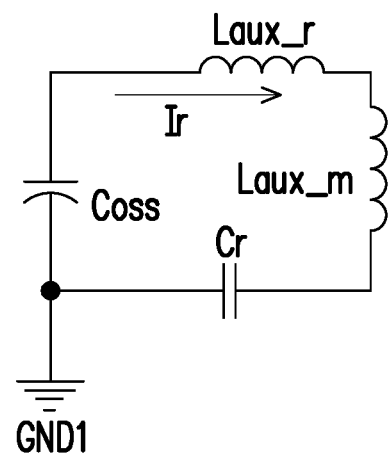
FIG. 4 is a schematic equivalent diagram illustrating a resonant tank according to an embodiment of the invention.

With reference to FIG. 4, FIG. 4 is a schematic equivalent diagram illustrating a resonant tank according to an embodiment of the invention. The resonant tank is a loop generated by the parasitic capacitor Coss, the turned-on auxiliary diode (not shown in FIG. 4), the auxiliary leakage inductor Laux_r, the auxiliary excitation magnetic inductor Laux_m, and the resonant capacitor Cr. Note that the parasitic capacitor Coss is incapable of resonating with the main leakage inductor Lr of the main transformer circuit 110 owing to resonance in the resonant tank. Hence, the energy stored in the parasitic capacitor Coss may be rapidly conducted to the grounding terminal GND1 of the power supply side Vin through conduction paths of the turned-on auxiliary diode, the auxiliary leakage inductor Laux_r, the auxiliary excitation magnetic inductor Laux_m, and the resonant capacitor Cr, so that the voltage spike of the high-frequency ring is prevented from being generated on the power switch 120.

With reference to the embodiments of FIG. 2 and FIG. 3 again, since the resonant tank is formed when the time interval T2 begins, the voltage spike of the high-frequency ring is not to be generated when the power switch 120 is turned off.

The following refers to the design of the resonant circuit 140. With reference to the embodiments of FIG. 2 and FIG. 3 together, in this embodiment, an inductance value of the auxiliary leakage inductor Laux_r, an inductance value of the auxiliary excitation magnetic inductor Laux_m, and a capacitance of the resonant capacitor Cr are all designed. As such, after the resonant tank is generated, the energy consumed by the auxiliary leakage inductor Laux_r and the auxiliary excitation magnetic inductor Laux_m is greater than the energy stored in the parasitic capacitor Coss and the resonant capacitor Cr.

Further, in order to allow the energy consumed by the auxiliary leakage inductor Laux_r and the auxiliary excitation magnetic inductor Laux_m to be greater than the energy stored in the parasitic capacitor Coss and the resonant capacitor Cr after the resonant tank is generated, design relationships among the inductance value of the auxiliary leakage inductor Laux_r, the inductance value of the auxiliary excitation magnetic inductor Laux_m, and the capacitance of the resonant capacitor Cr may be obtained according to formula (1), formula (2), and formula (3).

$$Lm = \text{l\_Laux\_r} + \text{l\_Laux\_m} \qquad \text{formula (1)}$$

$$Cm = \frac{\text{c\_Cr} \times \text{c\_Coss}}{\text{c\_Cr} + \text{c\_Coss}} \qquad \text{formula (2)}$$

$$\frac{1}{2} \times Lm \times \text{i\_Ir}^2 > \frac{1}{2} \times Cm \times \text{v\_Coss}^2 \qquad \text{formula (3)}$$

In formula (2), where Lm represents a total inductance value of the resonant tank, l_Laux_r represents the inductance value of the auxiliary leakage inductor Laux_r, l_Laux_m represents the inductance value of the auxiliary excitation magnetic inductor Laux_m, Cm represents a total capacitance of the resonant tank, c_Cr represents the capacitance of the resonant capacitor Cr, c_Coss represents the capacitance of the parasitic capacitor Coss, i_Ir represents the current value of the resonant current Ir, and v_Coss represents the voltage value between the two terminals of the parasitic capacitor Coss.

As shown in formula (3), formula (3) shows that total inductance consumption energy is required to be greater than total capacitance storage energy in the resonant tank. It thus can be seen that after the design relationships among the inductance value of the auxiliary leakage inductor Laux_r, the inductance value of the auxiliary excitation magnetic inductor Laux_m, and the capacitance of the resonant capacitor Cr are obtained according to formula (1), formula (2), and formula (3), inductance consumption energy is greater than the total capacitance storage energy in the resonant tank. Hence, the voltage VDS between the drain and the source of the power switch 120 may be pulled down to a zero potential before the time interval T2 ends. Hence, the resonant tank may enable the energy stored in the parasitic capacitor Coss to be completely released through the resonant current Ir. In this way, at a time interval T3, the power switch 120 features a characteristic of zero voltage switching (ZVS), and voltage conversion efficiency is thereby further enhanced.

In addition, in this embodiment, at the time interval T2, as shown by formula (4), a resonance frequency of the resonant current Ir of the resonant tank may be obtained through the total inductance value and the total capacitance of the resonant tank.

$$fr = \frac{1}{2 \times \pi \times \sqrt{Lm \times Cm}} \quad \text{formula (4)}$$

fr represents the resonance frequency. A resonance cycle is a reciprocal of the resonance frequency, so duration of the time interval T2 may be determined by the resonance cycle.

In view of the foregoing, in the power conversion device of the invention, the switch circuit is enabled according to the energy stored in the output capacitor of the main transformer circuit when the power switch is turned on, so that the energy of the voltage difference associated between the anode and the cathode of the output diode is coupled to the resonant circuit via the auxiliary transformer, and that the resonant circuit obtains the coupling energy. When the power switch is turned off, the resonant circuit and the parasitic capacitor of the power switch form the resonant tank coupled to the grounding terminal of power supply side according to the coupling energy. In this way, in the power conversion device, the energy of the parasitic capacitor is conducted to the grounding terminal of the power supply side via the resonant tank, so that the voltage spike of the high-frequency ring is prevented from being generated on the power switch, and thus, circuit noise and electromagnetic interference are less likely to occur, and the power switch is less susceptible to damaged caused by the voltage spike. In addition, when the resonant tank is formed, the resonant tank may enable the energy stored in the parasitic capacitor to be completely released through the resonant current. In this way, the power switch features the characteristic of zero voltage switching, and voltage conversion efficiency is therefore enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power conversion device, comprising a main transformer circuit, wherein the main transformer circuit comprises a main transformer, a main leakage inductor coupled between a first side of the main transformer and a power supply side, an output capacitor coupled to a secondary side of the main transformer, and an output diode, wherein an anode of the output diode is coupled to the secondary side of the main transformer, and a cathode of the output diode is coupled to the output capacitor, wherein the power conversion device further comprises:
   a power switch, coupled between the first side of the main transformer and a grounding terminal of the power supply side, configured to be turned on or turned off through receiving a switch signal;
   an auxiliary transformer, a secondary side of the auxiliary transformer coupled to the secondary side of the main transformer;
   a resonant circuit, coupled to the power switch and a first side of the auxiliary transformer; and
   a switch circuit, coupled to the secondary side of the main transformer, wherein the output diode is turned off and the switch circuit is enabled according to energy stored in the output capacitor when the power switch is turned on, so that energy associated with the secondary side of the main transformer is coupled to the resonant circuit via the auxiliary transformer and that the resonant circuit obtains coupling energy,
   wherein the resonant circuit and a parasitic capacitor between a first terminal of the power switch and a second terminal of the power switch form a resonant tank coupled to the grounding terminal of the power supply side according to the coupling energy when the power switch is turned off.

2. The power conversion device as claimed in claim 1, wherein total inductance consumption energy is greater than total capacitance storage energy in the resonant tank.

3. The power conversion device as claimed in claim 1, wherein:
   the secondary side of the auxiliary transformer is further coupled between the anode of the output diode and the switch circuit, and
   a voltage difference between a voltage stored in the output capacitor and a voltage at the anode of the output diode is coupled to the first side of the auxiliary transformer by the auxiliary transformer from the secondary side of the auxiliary transformer when the power switch is turned on, so that the resonant circuit obtains the coupling energy.

4. The power conversion device as claimed in claim 1, wherein the switch circuit comprises:
   a transistor switch, a first terminal of the transistor switch coupled to the cathode of the output diode, a second terminal of the transistor switch coupled to the secondary side of the auxiliary transformer, a control terminal of the transistor switch configured to receive the energy stored in the output capacitor.

5. The power conversion device as claimed in claim 4, wherein the transistor switch is turned on according to a high voltage level stored in the output capacitor to enable the switch circuit.

6. The power conversion device as claimed in claim 1, wherein the resonant circuit comprises:
   an auxiliary diode, an anode of the auxiliary diode coupled to the first terminal of the power switch;
   an auxiliary leakage inductor, a first terminal of the auxiliary leakage inductor coupled to the cathode of the auxiliary diode;

an auxiliary excitation magnetic inductor, a first terminal of the auxiliary excitation magnetic inductor coupled to the first terminal of the auxiliary leakage inductor, the auxiliary excitation magnetic inductor connected to the first side of the auxiliary transformer in parallel; and a resonant capacitor, a first terminal of the resonant capacitor coupled to a second terminal of the auxiliary excitation magnetic inductor, a second terminal of the resonant capacitor coupled to the second terminal of the power switch and the grounding terminal of the power supply side.

7. The power conversion device as claimed in claim 6, wherein the auxiliary diode is cut off according to the coupling energy received by the auxiliary excitation magnetic inductor when the power switch is turned on.

8. The power conversion device as claimed in claim 6, wherein the auxiliary diode is turned on according to the coupling energy and generation of an induction current when the power switch is turned off, so as to generate the resonant tank.

9. The power conversion device as claimed in claim 6, wherein the resonant tank is a loop generated through the parasitic capacitor, the turned-on auxiliary diode, the auxiliary leakage inductor, the auxiliary excitation magnetic inductor, and the resonant capacitor.

10. The power conversion device as claimed in claim 6, wherein energy consumed by the auxiliary leakage inductor and the auxiliary excitation magnetic inductor is greater than energy stored in the parasitic capacitor and the resonant capacitor when the resonant tank is generated.

* * * * *